United States Patent [19]

Yagoto et al.

[11] Patent Number: 4,878,067
[45] Date of Patent: Oct. 31, 1989

[54] LASER RECORDER WITH STABLE FILM FEED AUXILIARY SCANNING

[75] Inventors: Mitsutoshi Yagoto; Akiyoshi Hamada; Masayuki Mino, all of Toyokawa; Yutaka Tanaka, Kawasaki; Yutaka Watanabe, Tokyo, all of Japan

[73] Assignee: Minolta Camera Kabushiki Kaisha, Osaki, Japan

[21] Appl. No.: 267,668

[22] Filed: Nov. 4, 1988

Related U.S. Application Data

[63] Continuation of Ser. No. 41,077, Apr. 21, 1987, abandoned.

[30] Foreign Application Priority Data

| Apr. 22, 1986 | [JP] | Japan | 61-92861 |
| Apr. 22, 1986 | [JP] | Japan | 6192862 |
| Apr. 22, 1986 | [JP] | Japan | 61-92863 |
| Apr. 22, 1986 | [JP] | Japan | 61-92864 |

[51] Int. Cl.⁴ .............................................. G01D 9/42
[52] U.S. Cl. ...................................... 346/108; 346/136
[58] Field of Search ............... 346/108, 107 R, 160, 346/134, 136, 762; 355/16

[56] References Cited

U.S. PATENT DOCUMENTS

| 4,067,021 | 1/1978 | Baylis | 346/108 |
| 4,257,053 | 3/1981 | Gilbreath | |
| 4,307,408 | 12/1981 | Kiyohara | 346/108 |

FOREIGN PATENT DOCUMENTS

57-193170 11/1982 Japan .
59-116748 7/1984 Japan .

Primary Examiner—E. A. Goldberg
Assistant Examiner—Mark Reinhart
Attorney, Agent, or Firm—Burns, Doane, Swecker & Mathis

[57] ABSTRACT

A laser recorder applicable to computer output microfilm recording apparatus, which comprises; a housing, a film feeding unit having a film cassette containing a rolled heat development film and disposed in the lower section of the housing, a film take-up unit taking up the heat developement film on a reel or on a tray in sheet films, a main driving unit and driving the heat development film for running at a fixed speed for auxiliary scanning for recording image information on the heat development film, an image information recording unit for main scanning, having a laser optical system for scanning the heat development film across the width thereof to record image information thereon, and a heat developement unit for heat-developing the image information recorded on the heat development film.

10 Claims, 6 Drawing Sheets

LASER RECORDER WITH STABLE FILM FEED AUXILIARY SCANNING

This application is a continuation of application Ser. No. 041,077, filed Apr. 21, 1987 now abandoned.

BACKGROUND OF THE INVENTION

1. Field of the Invention

The present invention relates to a laser recorder suitable for use, for example, as a computer output microfilm producing apparatus (hereinafter abbreviated to "COM apparatus") which records image information on a dry silver halide photographic film by using a laser beam emitted from a laser, and then develops the image information by a heat development process.

2. Description of the Prior Art

Improvement of the performance and enhancement of the functions of reproducing apparatus for reproducing the output of information processing equipment including computers have become a significant subject of research and development with the progressive development of high-performance information processing equipments. Among those reproducing apparatus, reproducing apparatus employing a laser light source, such as laser printers and the like, are the most promising reproducing apparatus. For example, U.S. Pat. No. 4,257,053 discloses underlying method together with construction details of a plotter using a laser as a light source. Also, the Japanese unexamined Published Patent Application No. SHO 59-116748 discloses a heat-developing device wherein a laser beam is radiated onto a heat development film. The Japanese unexamined Published Patent Application No. SHO 57-193170 discloses a laser recorder wherein the auxiliary scanning is operated by a stepping motor. However, conventional reproducing apparatus have not been satisfactory in size and performance. With COM apparatus also, further reduction in size, particularly in thickness, simplification of operation and improvement of performance has become necessary with the development of high-performance information processing equipment.

SUMMARY OF THE INVENTION

Accordingly, one of the objects of the present invention is to provide a laser recorder suitable for use as a COM apparatus, capable of high-quality and high-density image information recording, compact in construction, small in size and highly accessible.

Another object of the invention is to provide a laser recorder capable of driving film at a low and more accurately fixed speed, in which the auxiliary scanning is operated by a DC servomotor.

Further, another object of the invention is to provide a laser recorder which has a heat-developing device capable of mostly unevenness in developing To achieve the objects of the invention, the present invention provides a laser recorder comprising: a housing; a film feeding unit for feeding a heat development film stored in a roll, disposed in the lower section of the housing; a film take-up unit disposed in the upper section of the housing; a substantially vertical film path formed between the film feeding unit and the film take-up unit; a main driving unit for driving the heat development film at a fixed speed for auxiliary scanning operation, disposed in the middle section of the housing on the film path; an imgae information recording unit having a laser optical system, for main scanning in which the heat development film is scanned across the width thereof to record image information thereon by means of a concentrated laser beam as the heat development film is driven by the main driving unit; and a heat development unit for heat-developing the image information recorded on the heat development film by the image information recording unit, disposed between the main driving unit and the film take-up unit opposite to the film path.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Having generally described this invention, a further understanding can be obtained by reference to certain specific examples which are provided herein for purposes of illustration only and are not intended to be limiting unless otherwise specified.

Figure 1:
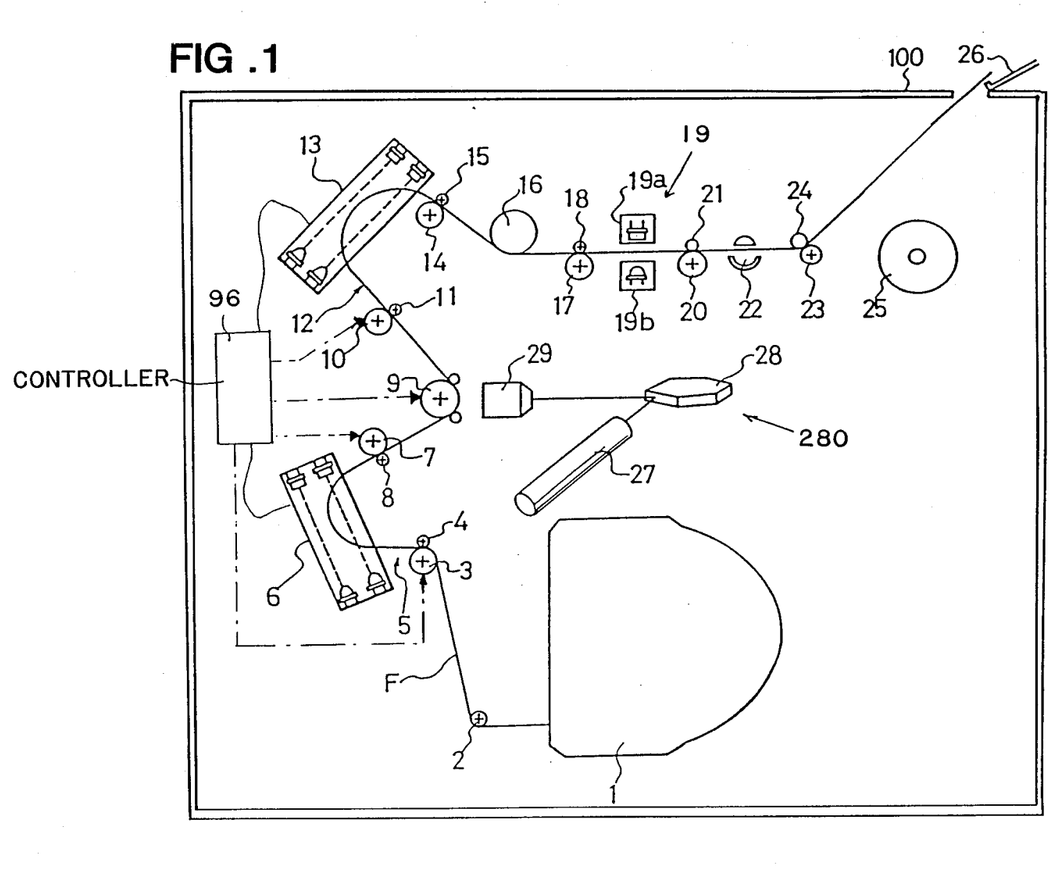
FIG. 1 is a diagrammatic illustration showing the configuration of a laser recorder, in a preferred embodiment, according to the present invention.

A schematic drawing of a laser recorder in a preferred embodiment is shown in FIG. 1, wherein a DAKOMATIC film (resistered trade mark; produced by Eastman Kodak Co.), namely, a 16 mm dry silver halide photographic film is used as a recording medium. As the rolled heat development film, a rolled dry silver halide photographic film of 8 mm, 16 mm, 35 mm or 148 mm, such as DOKOMATIC of 170 m in length or an equivalent may be used.

Referring to FIG. 1, a rolled unexposed film F is contained in an unexposed film supply cassette 1. The cassette 1 is provided in a film feed unit disposed in the lower section of a housing 100. A film path is formed by sequentially arranging a lower guide roller 2, a film feed roller 3, a pressure roller 4 pressing the film F against the film feed roller 3, a lower loop forming section 5, a lower loop detector 6, a loading roller 7, a pressure roller 8 pressing against the loading roller 7, a main driving roller 9, an upper guide roller 10, a pressure roller 11 pressing against the upper guide roller 10, an upper loop forming section 12, an upper loop detector 13, a timing roller 14 serving as a feed roller, a pressure roller 15 pressing against the timing roller 14, a heat roller 16, a driving roller 17 serving as a discharge roller, a pressure roller 18 pressing against the driving roller 17, an image density detector 19, a driving roller 20, a pressure roller 21 pressing against the driving roller 20, a cutter 22 for cutting the film F, film delivery rollers 23 and 24, a film take-up reel 25, and a tray 26. A laser optical system 280 comprises a helium-neon laser emitter 27 as a light source for radiating a laser beam across the film F on the main driving roller 9 driving main scanning operation to form a latent image on the film F, an optical modulator (not shown), a polygonal rotating mirror 28, and lens unit 29. The laser optical system 280 is disposed opposite to the main driving roller 9. The film F drawn out from the cassette 1 disposed in the lower section of the housing 100 is advanced along the film path toward the upper section of the housing 100.

The film feed roller 3 is driven by a servomotor to draw out the film F from the cassette 1. Loops of the film F formed in the lower and upper loop forming sections 5, 12 absorb the difference in film driving speed between the individual driving components of the film driving system to enable the main driving roller 9 to rotate accurately at a fixed rotating speed. The lower loop detector 6 and the upper loop detector 13 may be of any suitable constitution provided that the loop detectors 6 and 13 do not damage the image recording surface of the film F. In this embodiment, the lower loop detector 6 and the upper loop detector 13 each comprises two sets of detecting sensors each of a combination of an infrared ray emitting diode and a photodiode.

The main driving roller 9 is rotated at a fixed circumferential speed of 2.5 mm/sec. The size of the loop of the film F detected by the lower loop detector 6 is fed back to a controller 96 for controlling a servomotor (not shown) for driving the film feed roller 3. When an excessively large loop is formed and thereby both the infrared rays emitted from the photodiodes are intercepted by the film F, the film feed roller 3 is stopped, and then the loop diminishes gradually as the main driving roller 9 advances the film F. After the loop has diminished to an extent where neither of the infrared rays is intercepted by the film F, the film feed roller 3 is restarted. Thus, the film feed roller 3 is driven for rotation intermittently so that the size of the loop varies in a fixed range.

The main driving roller 9 needs to be driven at a highly accurate low circumferential speed for auxiliary scanning operation, in which image information is written on the film F in longitudinal direction, namely in Y-axis direction. For example, to form an image in dot density of 9600 dots per inch (DPI), the pitch of scanning lines for auxiliary scanning operation must be 2.6 micrometers. Since image information is written in fifteen frames in a minute, the writing time for one frame is four seconds. Since the length of the frame is 10 mm, as mentioned above, the film F needs to be fed at a very low speed of 2.5 mm/sec. Accordingly, the main driving roller 9 is driven by a stepping motor or a DC servomotor for microstep feed. The stepping operation is controlled so that the film F is fed highly accurately.

The auxiliary scanning operation is implemented while the film F is fed by the main driving motor 9 while, on the other hand, the main scanning operation is implemented by rotation of the mirror 28. A loop size detected by the upper loop detector 13 is fed back to the control 96 to control the timing roller 14 driving speed, so that the loop size is regulated within a predetermined range. Simultaneously, development time at the heat roller 16 is controlled by the timing roller 14. After passing the timing roller 14, the back side of emulsion coated film F is brought into contact with the lower circumference surface of the heat roller 16, which has a rotating shaft disposed horizontally. In this emodiment, the heat roller 16 is maintained at 115° C. (DEG.), and the development time is five seconds, which is appropriated to the film F in this embodiment.

When performing heat development, in the case where a heat roller has a vertically disposed rotating shaft and a film is brought into contact from the transverse direction, temperature diferences arise in vertically direction of the film. According to an experiment, unevenness of image density occures when the temperature differences exceed the range of $\pm/-1.5°$ C. (DEG.). According to another experiment, in the case where a heat roller has a horizontally disposed rotating shaft and a film is brought into contact from the upper direction, the film may be deformed substantially even when it is retracted from the heat roller to a stand-by position because the heat source is disposed below the film. Accordingly, a rotating shaft of the heat roller 16 is disposed horizontally and the back side of emulsion coated film F is brought into contact with lower circumference of the heat roller 16. Therefore, the film F' will not be affected by heat when it is moved to the stand-by position, because the heat source is disposed above the film F.

The developed film F is pulled by the delivery rollers 23 and 24, and is guided toward the film take-up reel 25 or the tray 26. The image density detector 19 and the cutter 22 are disposed in the film path. The image density detector 19 which comprises a light emitting diode 19a and a photo diode 19b detects the density of the developed image, and the intensity of the helium-neon laser beam radiated by the helium-neon laser emitter 27 is controlled to regulate exposure on the basis of the results of image density detection.

The cutter 22 cuts the developed film F into sheet films of a predetermined length when it so desired. These sheet films are delivered by the delivery rollers 23 and 24 to the tray 26. When the film F is desired to be kept in a roll, it is wound on the film take-up reel 25 without being cut by the cutter 22.

Figure 2:
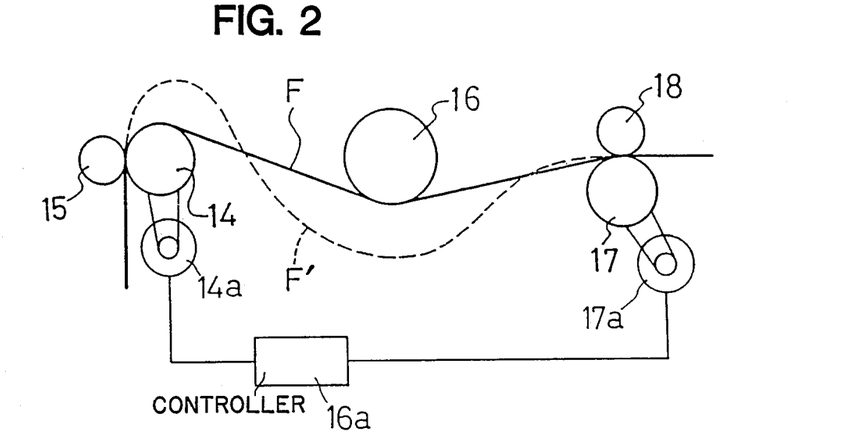
FIG. 2 is a schematic illustration useful in explaining the manner of slackening the heat development film.
Figure 3:
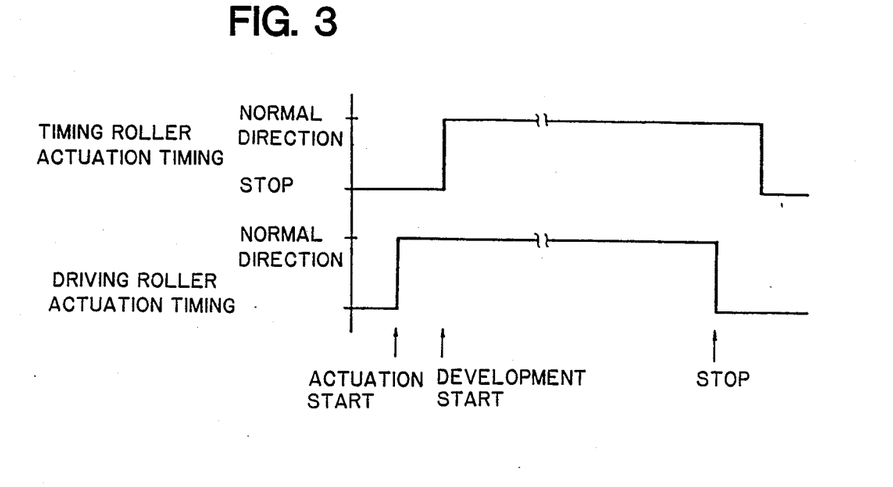
FIGS. 3 and 4 are time charts showing two different modes of operation of a timing roller and a driving roller for slackening the heat development film, respectively.
Figure 4:
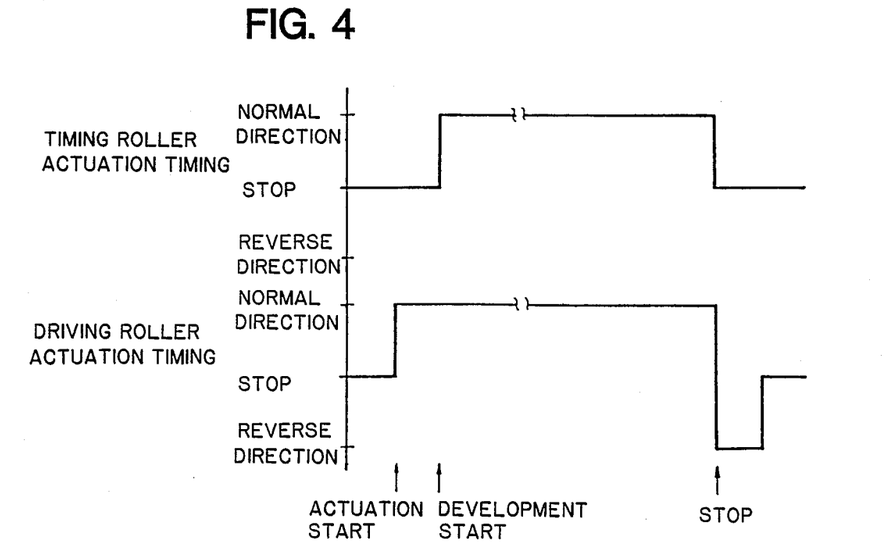

A film separating mechanism for separating the film F from the heat roller 16, which is one of the features of the present invention, will be discribed with reference to FIGS. 2, 3 and 4. Referring to FIG. 2, the film separating mechanism comprises the timing roller 14 driven by a motor 14a and combined with the pressure roller 15, disposed before the heat roller 16 with respect to the direction of advancement of the film F, and the driving roller 17 driven by a motor 17a and combined with the pressure roller 18, disposed after the heat roller 16 with respect to the direction of advancement of the film F. During the heat development operation, the driving roller 17 is rotated in the normal direction so that the film F is extended at a predetermined tension in contact with the heat roller 16 as indicated by a solid line. When stopping the heat development operation, a first stop signal is generated from a controller 16a to the motor 17a. After a fixed time from the driving roller 17 has been stopped, a second stop signal is generated from the controller 16a to the motor 14a. This time difference slackens the film F between the timing roller 14 and the driving roller 17 to separate the film F from the heat roller 16 as indicated by a broken line as F' in FIG. 2. In this embodiment, the driving roller 17 is stopped and the timing roller 14 is driven for rotation in the normal direction for the fixed time after the driving roller 17 has been stopped to separate the film F from the heat roller 16. However, it is also possible to separate the film F from the heat roller 16 by stopping the timing roller 14 and driving the driving roller 17 in the reverse direction for a fixed time after the timing roller 14 has been stopped. In this case, a stop signal is provided to the motor 14a and a reverse signal is provided to the motor 17a after a fixed time from when the timing roller 14 has been stopped.

These two different film separating modes of separating the film F from the heat roller 16 are shown in FIGS. 3 and 4, respectively.

In the manner described above, the film F is slackened between the timing roller 14 and the driving roller 17 and is separated from the heat roller. In restarting the heat development operation, first, the driving roller 17 is started, and then the timing roller 14 is started after a fixed time has passed from the start of the driving roller 17.

Figure 5:
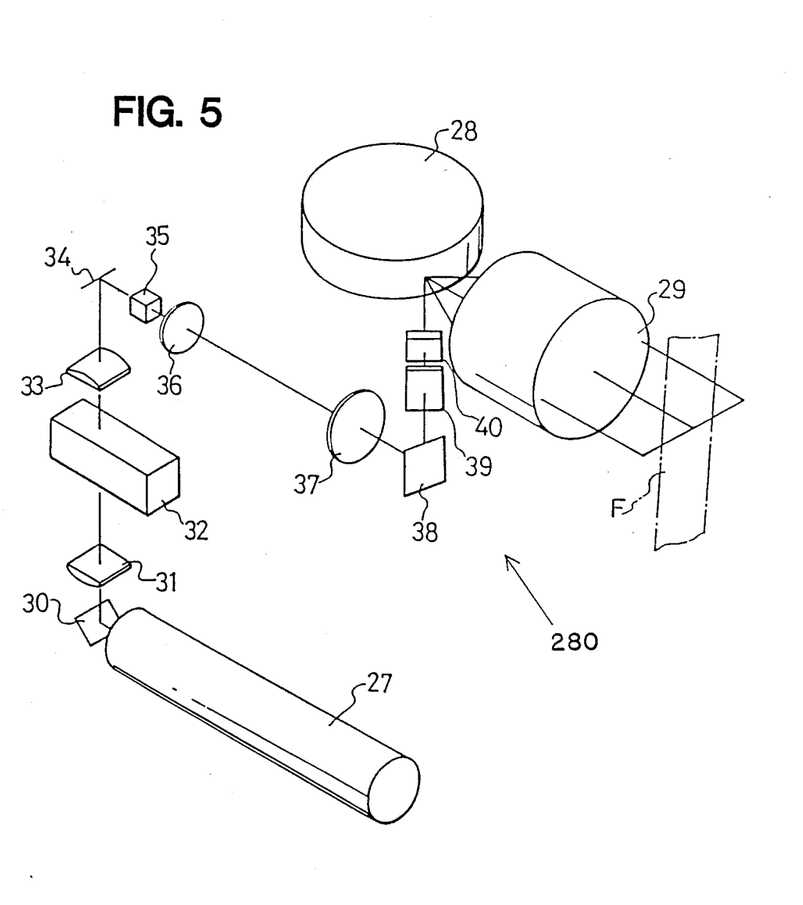
FIG. 5 is a schematic illustration useful in explaining the laser optical system, in a preferred embodiment, according to the present invention.

A laser optical system of a preferred embodiment will be described with reference to FIGS. 5, 6 and 7.

As shown in FIG. 1, the laser recorder of the present invention has a longitudinal film path disposed in a thin wall-like space to make the housing 100 thinner. On the other hand, laser scanning operation must be performed in the film width direction.

The optical system is so disposed as to satisfy the above requirements. Referring to FIG. 5, the laser beam, which is output by a helium-neon laser emitter 27, is deflected upwards by a plane mirror 30, then the laser beam is deflected laterally by a plane mirror 34 after passing through a cylindrical lens 31, A.O. modulator 32, and a cylindrical lens 33. Then, the laser beam is introduced to a plane mirror 38 after passing through a polarizing beam splitter 35, a spherical lens 36, and a spherical lens 37. An optical system consisting of elements up to the plane mirror 38 (hereinafter referred to as a first optical component) is contained in a vertical wall-like space which is parallel to the unexposed film supply cassette 1. Namely the plane in which the optical axis of the first optical component is disposed is approximately parallel to the plane containing the film path center line. The laser beam is further deflected by the plane mirror 38 through cylindrical lenses 39 and 40 so that the optical axis of the laser beam becomes horizontal as well as parallel to the film width direction (hereinafter this part of the optical system is referred to as a second optical component). And the laser beam is again deflected by a third optical component, which consists of a polygonal rotating mirror 28, and lenses 29 comprising a f-θ lens, so that the optical axis of the laser beam becomes horizontal as well as approximately perpendicular to the film surface. Finally, the laser beam is emitted onto the film F.

The components from the polygonal rotating mirror 28 up to the lenses 29 comprising the f-θ lens must be disposed in a manner so that the optical axis remains perpendicular to the film path, because the laser beam must scan the film perpendicularly to the film path. In the present invention, only a part of the light path from the plane mirror 38 to the polygonal rotating mirror 28 is designed so as to be contained in a horizontal plane which is approximately perpendicular to the plane containing the film path center line, therefore the whole laser optical system can be made thinner.

Figure 6:
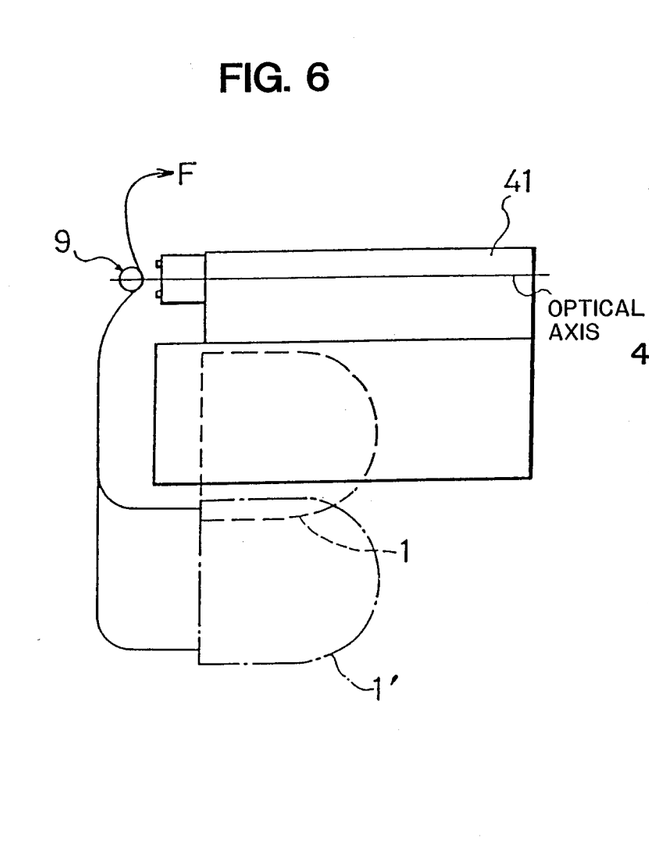
FIG. 6 is a schematic illustration useful in explaining the positional relationship between the laser optical system, shown by a block, and the unexposed film cassette.

According to the preferred embodiment, it is possible to form a optical block 41 as illustrated in FIG. 6. The unexposed film supply cassette 1, specified by broken lines, can be enclosed in the space formed in the inverted L-shaped optical block 41, making the film path shorter. The unexposed film supply cassette 1' specified by alternate long and short dash lines and the film path shown in FIG. 6 are drawn to show a modification of a laser recorder as a comparative example.

Figure 7:
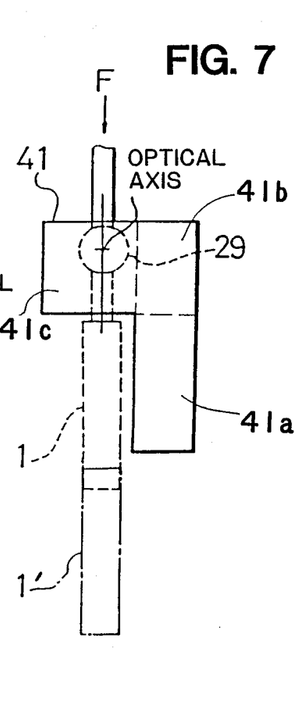
FIG. 7 is a front view of the schematic illustration of assistance in explaining the positional relationship between the laser optical system and the unexposed film cassette.

As shown in FIG. 7, when the optical block 41 is divided into spaces 41a, 41b and 41c, the said optical components are so accomodated that said first optical component is contained in spaces 41a and 41b, said second optical component in spaces 41b and 41c, and said third optical component in space 41c respectively.

Figure 8:
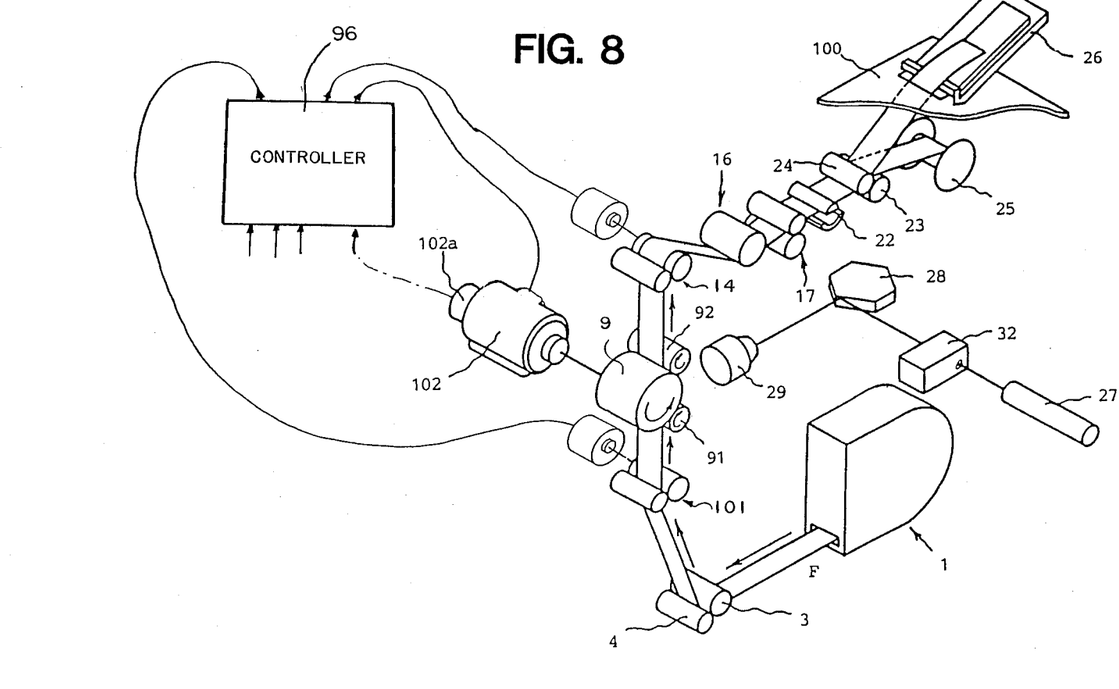
FIG. 8 is a perspective view showing the main units in a preferred embodiment, according to the present invention.
Figure 9:
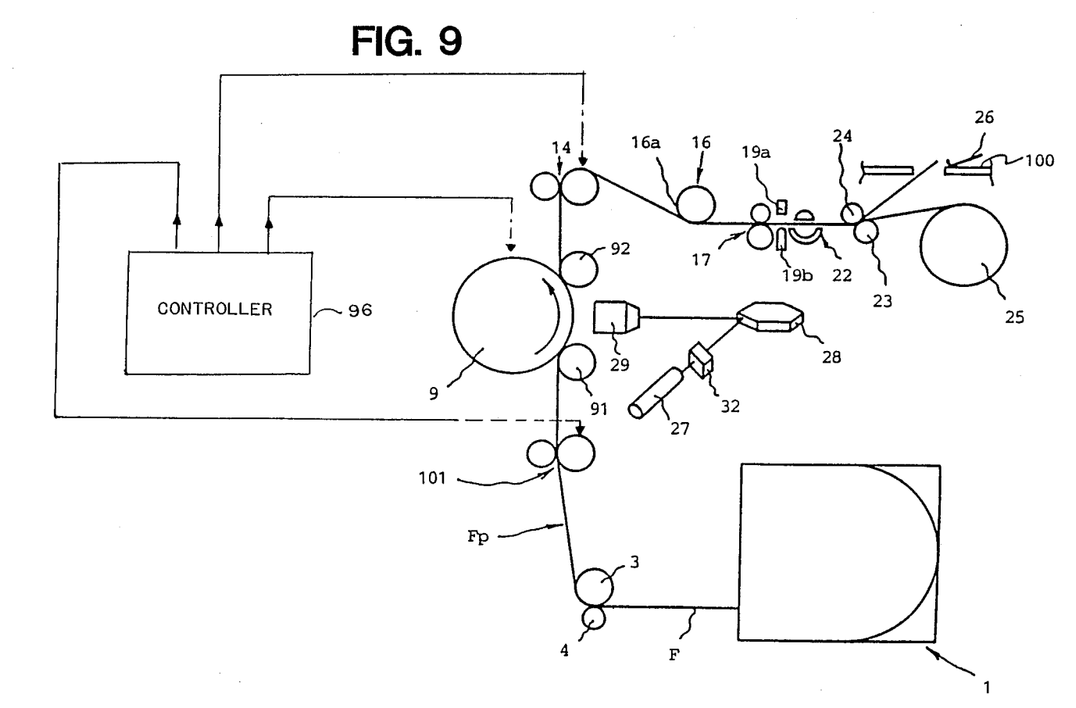
FIG. 9 is a system diagram of the units shown in FIG. 8 in a front view.

Hereinafter, a main driving unit in another preferred embodiment according to the present invention will be described as referring to FIGS. 8 and 9.

The main driving unit drives the film F at a fixed and low speed. The main driving unit is disposed on the film path formed between the film feed unit and the heat developed film take-up unit in the middle section of the housing 100. The main driving unit has a main driving roller 9 which is driven at a fixed and low speed of 2.5 mm/sec. bringing the film F into contact with the outer circumference thereof, and at least two pressure rollers 91 and 92, which press the film F onto the outer circumference of the main driving roller 9. The film F is pulled out from the film feed unit by a torque of the DC servomotor 102. At least a predetermined load is always applied to the DC servomotor 102. The DC servomotor 102 has a rotary encoder 102a. The rotary encoder 102a detects the revolving speed of the DC servomotor 102 to control applied voltages to the DC servomotor 102 and acts to keep the DC servomotor 102 revolving speed always at the fixed speed.

The film feed roller 3 is disposed between the main driving unit and the film feed unit. The film feed roller 3 rotates at a slightly slower speed than the speed of the main driving roller 9. The film F, which is pulled out from the film feed unit by the main driving roller 9, moves between the film feed unit and the film driving rollers, while maintaining a constant tension. The film feed driving rollers include the film feed roller 3 and the pressure roller 4, which is pressed onto the film feed roller 3 placing the film F therebetween and is driven by the film feed roller 3. The film feed roller 3 is linked with the DC servomotor 102, which drives the main driving roller 9 by a belt or the like (not shown), so that it interlocks with the DC servomotor 102.

A mechanism is provided not to transmit loads affecting the main driving roller 9 revolving speed from the other driving units disposed at a discharge side where the film leaves the main driving roller 9. For instance, film discharge driving rollers are disposed between the heat development unit and the heat developed film take-up unit. The film discharge driving rollers rotate at the same speed or a slightly slower speed than the speed of the main driving roller 9. The discharge driving rollers include the film delivery rollers 23 and 24, the latter of which places the film F therebetween and is driven by the film delivery roller 23. The film delivery roller 23 is linked with the DC servomotor 102 which drives the main driving roller 9 by a belt or the like (not shown), so that it interlocks with the DC servomotor 102. A first guide roller 101 is disposed between the main driving unit and the film feed unit. The timing roller 14 is disposed between the main driving unit and the heat development unit, and the driving roller 17 is disposed between the heat development unit and the film delivery rollers 23 and 24.

When the laser recorder is actuated, the film feed unit, the film feed roller 3, the main driving unit and the film delivery roller 23 are actuated. Then, the film F drawn out from the film feed unit is fed to the film take-up unit through the film feed driving rollers while being pulled by the main driving roller 9. Namely, the film F is drawn out from the film feed unit by the torque of the DC servomotor 102 when the main driving roller 9 is rotating. At the same time, at least a predetermined load is always applied to the DC servomotor 102 by the main driving roller 9. The film F always advances at a stable low speed. The film F is driven by the DC servomotor 102 being pressed against the outer circumference of the main driving roller 9 by pressure rollers 91 and 92, and the reverse side thereof which is not brought into contact with the main driving roller 9 is radiated by the laser beam emitted from the image information recording unit. The film F whose surface is recorded with image information by the image information recording unit is fed to the heat-development unit while being guided by the guide roller. The film F contacts the heat-development unit with the reverse side of the laser beam radiated surface, namely the backside thereof, for the heat-development. Then, the film F is advanced through the image density detector by the film delivery roller 23 to be stored in the heat-developed film take-up unit.

During an operation of the aforesaid laser recorder, the film F drawn out from the film feed unit is tensed while moving between the main driving roller 9 with which the film F is brought into contact and which is driven at a low speed, and the film feed roller 3 at the feed side to which the film approaches. On the other hand, the film F is not tensed while between the main driving roller 9 and the film delivery roller 23 disposed before the heat-developed film take-up unit at the discharge side of the main driving roller 9 where the film F leaves. Thus, the film drawing-out force is applied only to the film at the feed side from which the film F is fed to the main driving roller 9. But the discharging force which emits the film F abutting onto the main driving roller 9 is applied only by the main driving unit.

Therefore the revolving speed of the main driving roller 9 is substantially stablized. Also, the travelling speed of the reverse side of the film F being radiated by the laser beam is stablized, and the film F is moved highly accurately at a low speed. The film F at this position moves under pressure by the pressure rollers 91 and 91 to abut the outer surface of the main driving roller 9. Accordingly, the laser beam radiation to the heat-development film in the auxiliary scanning direction is performed highly accurately, and image information is recorded favorably.

In addition to the above advantages, the revolving speed of the main driving roller 9 does not fluctuate. This is because the main driving roller 9 is equipped with a rotary encoder which detects revolving speed fluctuation immediately to control voltages to be applied to the DC servomotor and compensates the voltages so as to regulate the DC servomotor revolving speed back to predetermined revolving speed at the instant when the revolving speed of the main driving roller 9, with which the film F is brought into contact, is going to fluctuate.

The laser recorder of present invention having the above-said construction has further improved heat-development reliability because the film separating mechanism for separating the film from the heat roller is provided, in the case when heat-development is not required during heat-development which is performed after the film is exposed to laser beam radiation, to eliminate problems arising from the phenomenon that a certain position of the film is heated for prolonged time and is damaged by the heat.

The laser recorder of present invention is a vertically longer and thinner equipment, and does not reqire large installation space, because the heat-development unit is disposed at the upper section in the housing of the laser recorder. Unevenness in developing can hardly occur, because the heat source is disposed at the upper section as described above, and the backside of emulsion coated film is brought into contact with the lower circumference of the heat roller so that the film is not adversely affected by direct contact with the heat source.

The laser recorder of the present invention has become thinner, because the film path is constructed between the film feed unit and the film take-up unit in a vertically elongated design, and is disposed in a plane. The laser optical system can also be made thinner because the optical block containing the laser beam source is constructed in the inverted L-shaped design. In addition, the above mentioned film path can be constructed to be shorter in length, and the equipment as a whole becomes more compact and thinner, and the installation space has been further reduced, because the unexposed film cassette is installed in the space formed by the inverted L-shaped design.

Having now fully described the invention, it will be apparent to one of ordinary skill in the art that many changes and modifications can be made thereto without departing from the spirit or scope of the invention as set forth herein.

What is claimed is:

1. A laser recorder comprising;
   a housing;
   a film feeding unit for feeding a film stored in a roll, disposed in said housing;
   a film take-up unit disposed in said housing to form a film path extending between said film feeding unit and said film take-up unit;
   a main driving unit for driving the film for running at a fixed speed, disposed on said film path extending between said film feeding unit and said film take-up unit, said main driving unit includes a main driving roller for driving the film in contact with the outer circumference of said roller so as to draw out the film from said film feeding unit, at least two pressure rollers for pressing the film against the outer circumference of said main driving roller, a DC servomotor for driving said main driving roller, and film delivery rollers being driven at a slightly slower speed than said main driving roller, thereby functioning as resistance in contact with the film when said film is drawn out from said film feeding unit onto said film path extending between said film feeding unit, and an image information recording unit having a laser optical system, for scanning the film by a laser beam across the width of the film being held and driven by said main driving unit.

2. A laser recorder as recited in claim 1, which further comprises a driven guide roller disposed between said main driving roller and said film feeding unit, and a loop forming unit disposed between said driven guide roller and said film feeding unit.

3. A laser recorder comprising;
a first conveying means for conveying a film stored in a roll to a scanning position at a first speed;
a second conveying means driven by a DC servomotor for conveying the film at the scanning position at a second speed, said second speed being slightly faster than said first speed; and
means for scanning a laser beam across the film at said scanning position.

4. A laser recorder as recited in claim 3, wherein said second conveying means comprises a main driving roller driven by said DC servomotor and a pair of pressure rollers disposed in contact with said main driving roller, and an exposure portion is formed between said pair of pressure rollers.

5. A laser recorder as recited in claim 4, wherein said second conveying means further comprises a DC servomotor which drives said main roller.

6. A laser recorder comprising;
a scanning means for radiating a laser beam across a film at a scanning position;
a conveying means for conveying said film for running at a fixed speed by a DC servomotor at said scanning position; and
means for applying resistance to the film being conveyed by passing said film past said means for applying resistance at a speed slightly slower than said fixed speed, said means for applying resistance being disposed before said conveying unit with respect to the direction of running of said film.

7. A laser recorder comprising;
a film feeding unit for feeding a heat development film stored in a roll;
a film take-up unit for taking-up the film disposed to form a film path extending between said film feeding unit and said film take-up unit;
a main driving unit for auxiliary scanning an image by driving the film at a fixed speed on said film path extending between said film feeding unit and said film take-up unit;
an image information recording unit having a laser optical system for main scanning the film by a laser beam across the width of the film being held and driven by said main driving unit; and a developing unit for heat-developing the image information recorded on the film by said image information recording unit, disposed facing said film path extending between said main driving unit and said film take-up unit,
said developing unit comprises;
a heat roller for heat-developing the image information by bringing the film into contact with said heat roller;
a timing roller disposed before said heat roller with respect to the direction of running of the film;
a driving roller disposed after said heat roller with respect to the direction of running of the film; and
a controller for controlling the rotation and stop of said timing roller and said driving roller to separate the film from said heat roller by stopping one roller upon the reception of a film stop signal and rotating the other roller for a predetermined time after the reception of said film stop signal.

8. A laser recorder as recited in claim 7, wherein said controller has a mode which stops said driving roller upon the reception of a film stop signal and rotates said timing roller in the normal direction for a predetermined time after the reception of said film stop signal.

9. A laser recorder as recited in claim 7, wherein said controller has a mode which stops said timing roller upon the reception of a film stop signal and rotates said driving roller in the reverse direction for a predetermined time after the reception of said film stop signal.

10. A laser recorder comprising;
a film feeding unit for feeding a heat development film stored in a roll;
a film take-up unit to form a film path extending between said film feeding unit and said film take-up unit;
a main driving unit for auxiliary scanning an image by driving the film at a fixed speed on said film path extending between said film feeding unit and said film take-up unit;
an image information recording unit having a laser optical system for main scanning the film by a laser beam across the width of the film being held and driven by said main driving unit;
a heat developing unit for heat-developing the image information recorded on the film by said image information recording unit, disposed facing said film path extending between said main driving unit and said film take-up unit; and
a means for pressing the film passing said heat-developing unit against said heat-developing unit during film driving, and for separating the film from said heat-developing unit during an interruption of film driving.

* * * * *

UNITED STATES PATENT AND TRADEMARK OFFICE
CERTIFICATE OF CORRECTION

PATENT NO. : 4,878,067
DATED : October 31, 1989
INVENTOR(S) : Mitsutoshi Yagoto; Akiyoshi Hamada; Masayuki Mino; Yutaka Tanaka; Yutaka Watanabe.

It is certified that error appears in the above-identified patent and that said Letters Patent is hereby corrected as shown below:

In the Title, after the word "FEED", add --FOR--.

Signed and Sealed this

Ninth Day of October, 1990

*Attest:*

HARRY F. MANBECK, JR.

*Attesting Officer*          *Commissioner of Patents and Trademarks*